(12) United States Patent
Choby et al.

(10) Patent No.: US 8,370,032 B2
(45) Date of Patent: Feb. 5, 2013

(54) SYSTEMS AND METHODS FOR SHIFT CONTROL FOR VEHICULAR TRANSMISSION

(75) Inventors: Jordan Choby, Huntington Beach, CA (US); Ken Mathis, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1201 days.

(21) Appl. No.: 11/776,975

(22) Filed: Jul. 12, 2007

(65) Prior Publication Data

US 2009/0018732 A1 Jan. 15, 2009

(51) Int. Cl.
*G06F 7/00* (2006.01)
*G06F 19/00* (2006.01)

(52) U.S. Cl. ........... 701/51; 701/70; 303/9.62; 303/161; 303/162; 477/34; 477/120; 477/901

(58) Field of Classification Search .................... 701/51, 701/70; 477/115, 120, 34, 901; 303/191–192, 303/9.62
See application file for complete search history.

(56) References Cited

U.S. PATENT DOCUMENTS

| | | | |
|---|---|---|---|
| 4,335,428 A * | 6/1982 | Miki et al. ................. 701/65 |
| 4,945,740 A * | 8/1990 | Kawano et al. ............. 70/248 |
| 5,172,609 A | 12/1992 | Nitz et al. |
| 5,231,582 A | 7/1993 | Takahashi et al. |
| 5,317,937 A | 6/1994 | Yoshizawa et al. |
| 5,428,531 A | 6/1995 | Hayafune |
| 5,685,799 A | 11/1997 | Vukovich et al. |
| 5,758,302 A * | 5/1998 | Schulz et al. ............... 701/51 |
| 6,070,118 A | 5/2000 | Ohta et al. |
| 6,260,934 B1 * | 7/2001 | Lee ........................... 303/192 |
| 6,275,760 B1 | 8/2001 | Saito et al. |
| 6,290,627 B1 | 9/2001 | Kusafuka et al. |
| 6,516,261 B2 | 2/2003 | Ohashi et al. |
| 6,626,797 B2 * | 9/2003 | Shiiba et al. ............... 477/97 |
| 6,626,934 B2 * | 9/2003 | Blaeser et al. ............. 623/1.11 |
| 6,634,987 B2 * | 10/2003 | Jeon ........................... 477/114 |

(Continued)

FOREIGN PATENT DOCUMENTS

| CN | 101687500 A | * 3/2010 |
|---|---|---|
| DE | 112008001320 T5 | * 4/2010 |

(Continued)

OTHER PUBLICATIONS

An electric assist bicycle drive with automatic continuously variable transmission; Watterson, P.A.; Electrical Machines and Systems, 2008. ICEMS 2008. International Conference on; Publication Year: 2008 , pp. 2992-2997.*

(Continued)

*Primary Examiner* — Cuong H Nguyen
(74) *Attorney, Agent, or Firm* — Dinsmore & Shohl LLP (57) ABSTRACT

Systems and methods for shift control for vehicular transmission. A transmission may shift gears at designated transmission shift points. When the slope of the road grade encountered by a vehicle changes, the transmission shift points may be altered to provide better vehicle performance. According to one embodiment, road slope may be calculated based upon vehicle acceleration and acceleration caused by pedal depression. In such an embodiment, brake indication may be calculated from the same road slope calculation without the use of a brake signal switch. If brake application is indicated by the road slope calculation, transmission shifting may be adjusted to prevent poor vehicle performance.

21 Claims, 11 Drawing Sheets

U.S. PATENT DOCUMENTS

| | | | |
|---|---|---|---|
| 7,014,592 B2 | 3/2006 | Wiethe et al. | |
| 7,401,873 B2 * | 7/2008 | Werner | 303/191 |
| 7,734,404 B2 * | 6/2010 | Shiiba et al. | 701/70 |
| 7,762,633 B2 * | 7/2010 | Maskell et al. | 303/192 |
| 8,046,141 B2 * | 10/2011 | Nedachi et al. | 701/51 |
| 8,055,413 B2 * | 11/2011 | Jeon | 701/51 |
| 8,068,963 B2 * | 11/2011 | Sugiura et al. | 701/51 |
| 8,078,378 B2 * | 12/2011 | Bradley, IV | 701/70 |
| 8,103,420 B2 * | 1/2012 | Amisano et al. | 701/70 |
| 2001/0049573 A1 * | 12/2001 | Ohashi et al. | 701/51 |
| 2002/0162668 A1 * | 11/2002 | Carlson et al. | 172/4.5 |
| 2004/0002803 A1 | 1/2004 | Lee et al. | |
| 2007/0216222 A1 * | 9/2007 | Miyazaki et al. | 303/155 |
| 2009/0018732 A1 * | 1/2009 | Choby et al. | 701/51 |

FOREIGN PATENT DOCUMENTS

| | | | |
|---|---|---|---|
| JP | 2000-311243 | * | 10/2000 |
| JP | 2010533275 W | * | 10/2010 |
| KR | 95-61939 | * | 12/1995 |
| WO | PCT/EP01/14943 | * | 12/2001 |
| WO | WO02/46016 | * | 6/2002 |
| WO | PCT/EP02/12922 | * | 11/2002 |
| WO | PCT/SE03/0204 | * | 12/2003 |
| WO | WO2004/039646 | * | 5/2004 |
| WO | WO 2009009161 A1 * | 1/2009 | |

OTHER PUBLICATIONS

Hybrid Vehicle Power Transmission Modeling and Simulation with SimulationX; Wenyong Li; Abel, A.; Todtermuschke, K.; Tong Zhang; Mechatronics and Automation, 2007. ICMA 2007. International Conference on; Digital Object Identifier: 10.1109/ICMA. 2007.4303808; Publication Year: 2007, pp. 1710-1717.*

Clamping-Force Control for Electromechanical Brake; Chihoon Jo; Sungho Hwang; Hyunsoo Kim; Vehicular Technology, IEEE Transactions on; vol. 59, Issue: 7; Digital Object Identifier: 10.1109/TVT. 2010.2043696 Publication Year: 2010, pp. 3205-3212.*

Design and Development of SPC90 Slag Pot Carrier of Large Steel Slag Transportation Special Device for Steel Mills Guo Rui; Li Na; Zhao Jingyi; Information Engineering (ICIE), 2010 WASE International Conference on; vol. 3 Digital Object Identifier: 10.1109/ICIE. 2010.253; Publication Year: 2010, pp. 320-323.*

Chinese Patent Appln. No. 200880024205.6—First Official Action dated May 14, 2012.

International Search Report and Written Opinion pertaining to International application No. PCT/US2008/055108 dated Aug. 6, 2008.

* cited by examiner

SYSTEMS AND METHODS FOR SHIFT CONTROL FOR VEHICULAR TRANSMISSION

TECHNICAL FIELD

This invention generally relates to systems and methods for monitoring changes in calculated road slope to detect vehicle braking and to inhibit transmission gear change based upon that detection. More specifically, one embodiment relates to systems and methods for detecting vehicle braking by calculating a road slope based upon vehicle speed.

BACKGROUND

Generally, transmission control systems may be provided in a vehicle to effectuate transmission gear change (i.e., upshift or downshift) at particular intervals called shift points. These shift points may be selected by monitoring various vehicle conditions (i.e., acceleration, road grade, accelerator depression, speed, etc.) and calculating a shift point to minimize transmission gear "hunting", overrunning or misshifting. However, vehicle conditions may change suddenly, such as during vehicle braking, and previously calculated shift points may cause "hunting", overrunning and misshifting. Therefore, during vehicle braking it is often desirable to adjust the selected shift points to thereby improve the vehicle's driving performance. Typically, a brake lamp switch is used to indicate vehicle braking and to adjust the transmission's shift points. The brake lamp switch, however, may have inherent inaccuracies. For example, the switch may not be activated and thus vehicle braking is not indicated, even though the brake pedal is actually engaged. Consequently, the transmission may erroneously modify the transmission's shift points during vehicle braking thereby causing undesirable vehicle performance. Accordingly, there is a need for systems and methods that improve vehicle shifting, shift rehabilitation, and/or road grade calculation.

SUMMARY

According to one embodiment, a method for controlling a vehicle transmission having gears and being configured to respond to at least one shift point for effectuating an automatic gear change is provided. The method may comprise calculating a road slope based upon one or more detected conditions during vehicle travel and measuring a change in the calculated road slope. The method may further comprise detecting brake application based on the change in the calculated road slope and adjusting the transmission gear change point when brake application is detected.

According to another embodiment, a method for determining vehicle braking is provided. The method may comprise detecting conditions during vehicle travel and calculating a road slope based upon one or more detected conditions. The method may further comprise measuring a change in the calculated road slope and comparing the change in the calculated road slope to a range of values representative of actual slope change encountered by a vehicle. The method may further comprise indicating brake application when the change in the calculated road slope falls outside the range of values.

According to yet another embodiment, a system for vehicle braking indication is provided. The system may comprise vehicle condition sensors and at least one processor operative to calculate a road slope from information systems and to indicate vehicle brake application based upon the calculated road slope. The system may additionally comprise a transmission control system operative to adjust a transmission gear change point based upon the vehicle brake indication.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 1:
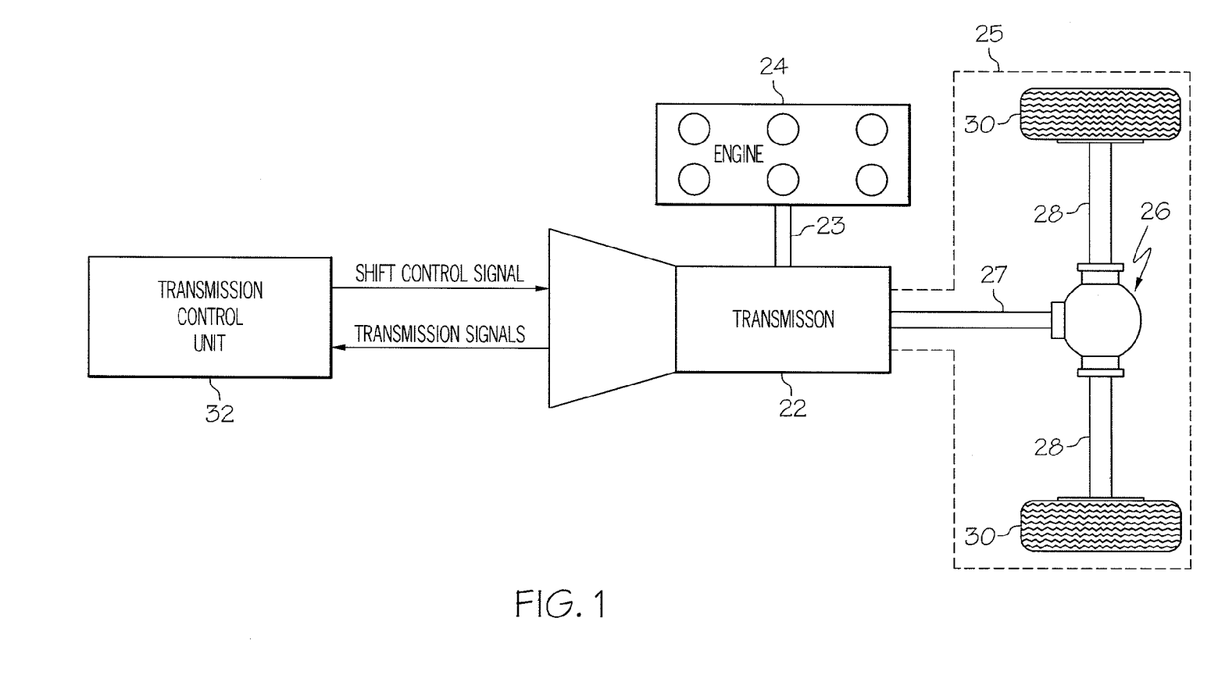
FIG. 1 is a schematic view of a transmission system in a vehicle in accordance with one illustrative embodiment of the present invention.

FIG. 1 illustrates a transmission system 20 which may be implemented in a vehicle. As illustrated, transmission system 20 may comprise a transmission control unit 32, a transmission 22 and a drivetrain 25. Transmission 22 may be connectedly engaged to an engine 24 through a drive member 23 such that engine 24 may provide rotational velocity to the transmission 22 by rotating drive member 23 at a given rotational velocity (revolutions per minute ("R.P.M.")). As discussed below, transmission 22 may be operable to change the rotational velocity provided by engine 24 and output such a changed rotational velocity. Transmission 22 may also be connectedly engaged to drivetrain 25 such that transmission 22 may drive the drivetrain 25 with changed output rotational velocity to thereby rotate wheels 30 of the vehicle.

In one embodiment, transmission 22 may be an automatic transmission commonly used in automobiles. Transmission 22 may comprise sets of selectable planetary gears capable of being selectively engaged to proportionally change the rotational velocity provided to transmission 22. Each proportional change associated with each planetary gear set may be defined as a particular gear ratio. For example, a planetary gear set having a gear ratio of 1:1 may provide engine rotational velocity directly to driveshaft 25 (i.e., one revolution per minute ("R.P.M.") of engine rotational velocity corresponds to one R.P.M. of drivetrain rotational velocity). Furthermore, a planetary gear set having a gear ratio of 3:1 may provide three times the engine rotational velocity to driveshaft 25 (i.e., one R.P.M. of engine rotational velocity corresponds to three R.P.M. of drivetrain rotational velocity). In addition, transmission 22 may comprise a torque converter to permit gear ratio to be alternatively selected during vehicle operation. In one embodiment, torque converter may momentarily disengage engine 24 from transmission 22 to permit a gear ratio change to occur. Of course, transmission 22 may be provided with particular planetary gear sets and gear ratios different from the embodiments described above. Furthermore, in other embodiments, other transmissions may be implemented such as a shift-assisted manual transmission.

As illustrated, drivetrain 25 may comprise a differential 26, a driveshaft 27 and axles 28 for providing rotational velocity from transmission 22 to wheels 30. In such an embodiment, rotational velocity from the transmission 22 may be provided to axles 28, through differential 26 and driveshaft 27 to wheels 30. It should be understood that such an embodiment is merely illustrative and other embodiments may be configured according to particular vehicle specifications or designs. For instance, drivetrain 25 may comprise two differentials 26, two driveshafts 27, and four axles 28 for providing rotational velocity from transmission 22 to four wheels 30, such as on a 4-wheel-drive vehicle. Furthermore, drivetrain 25 may be configured to drive any number of wheels such as six wheels (i.e., an ATV), four rear wheels (i.e., a tractor trailer), one wheel (i.e., a motorcycle) or any other number of wheels for driving a given vehicle. Consequently, it should also be understood that the configuration of drivetrain 25 is illustrative and may be configured according to particular vehicle specifications or designs. For instance, in some two wheel drive systems, transmission 22 may be connected directly to axles 28, thereby eliminating the need for driveshaft 27 and differential 26. Similarly, in some four-wheel vehicles, additional transmissions 22 may be implemented and connected directly to axles 28 thereby eliminating the need for driveshafts 27 and differentials 26.

Figure 2:
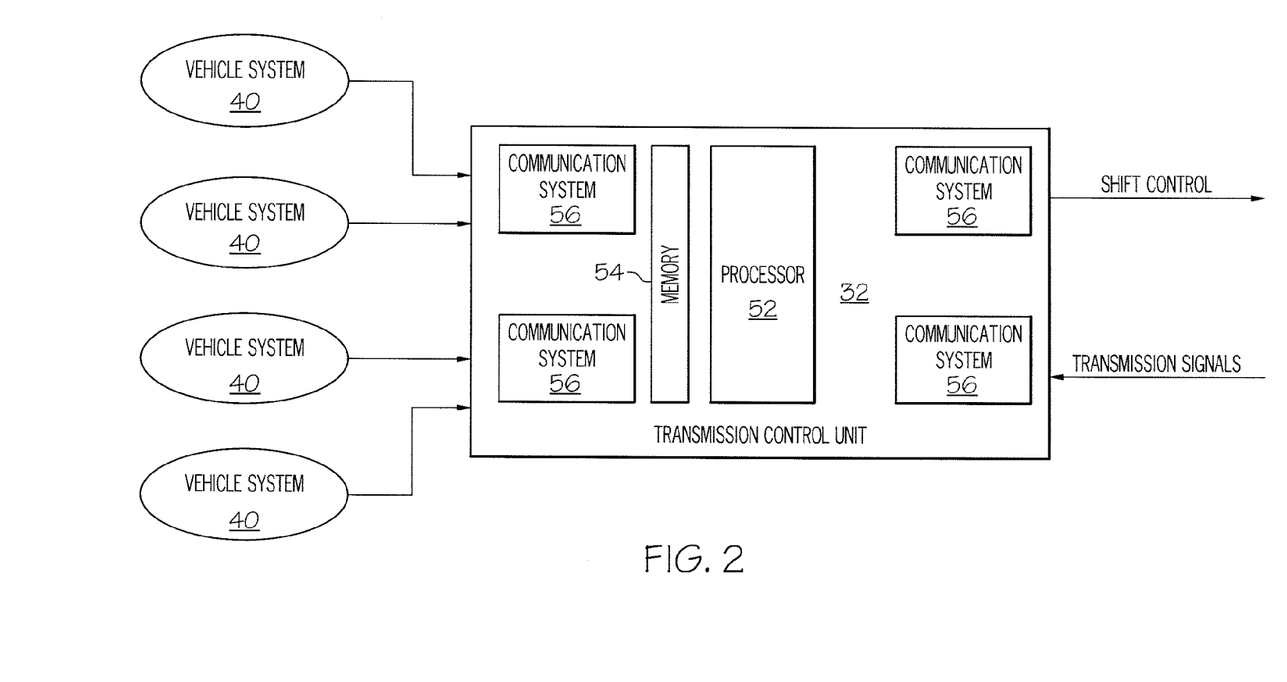
FIG. 2 is a block diagram of a transmission control unit for a transmission system in accordance with one illustrative embodiment of the present invention.

As illustrated in FIGS. 1 & 2, a transmission control unit 32 may be provided to control transmission 22 based upon vehicle condition data (i.e., vehicle data, transmission data, environmental data, user-provided data or any other data which may support transmission control). Transmission control unit 32 may be communicatively connected to transmission 22 to provide control signals to the transmission 22. Additionally and as shown in FIG. 2, transmission control unit 32 may be communicatively connected to a vehicle system 40 for providing data supportive of transmission control to transmission control unit 32. In one embodiment, transmission control unit 32 may communicate using fiber-optic communication (i.e., drive-by-wire, ethernet, etc.). However, transmission control unit 32 may communicate using other communication forms such as wireless communication (i.e., Blue-tooth, radio frequency, etc.), microwave communication, infrared communication, analog communication, or the like. Additionally, transmission control unit 32 may communicate using common vehicle communication formats such as J1850, Nexus, SCI, SPI, CAN or the like.

As illustrated in FIG. 2, transmission control unit 32 may include at least one communication system 56, memory 54 and a processor 52 to process data. Communication system 56 may be operative to communicate with vehicle system 40 and may be operative to collect information and transmit such information to processor 52 and/or memory 54. Communication system 56 may communicate with vehicle systems using common vehicle communication formats such as J1850, Nexus, SCI, SPI, CAN or the like. In addition, communication system(s) 56 may communicate using similar communication methods and forms discussed for transmission control unit 32.

As illustrated, memory 54 may be included in transmission control unit 32 to provide data storage. Memory 54 may be any device capable of storing data such as random access memory, a CD drive, a hard drive, or any other data storage device now known or hereafter developed. In addition, processor 52 may be included in transmission control unit 32 to perform logical operations on data. Processor 52 may be any electronic device, controller, microprocessor, circuitry or chipset capable of performing operations on data, such as a Motorola HC12, a Motorola x86, a Texas Instruments z80 or the like. Processor 52 may be responsible for the data processing in transmission control unit 32. Processor 52 may also implement algorithms to support such processing via programs, firmware, fuzzy logic, neural networks or other electronic algorithms in accordance with a particular design. In addition, processor 52 may communicate using similar communication methods and forms discussed for transmission control unit 32.

Transmission control unit 32 may process data to calculate shift points, calculate control routines, calculate optimization schemes, perform error correction, calculate protection schemes or process data in any other manner to support transmission control. Transmission control unit 32 may be any electronic module or circuitry for processing data and controlling transmission such as an MPC 500 based microcontroller, a MC56F8300 series microcontroller, or any other transmission controller commonly known in the art. In one embodiment, transmission control unit 32 may calculate transmission shift points based upon vehicle condition data and control transmission 22 based upon such shift points. In another embodiment, transmission control unit 32 may provide shift inhibition routines by monitoring vehicle and environmental conditions such as braking, precipitation, temperature or wind speed to determine whether a transmission shift may cause undesirable vehicle performance. In yet another embodiment, transmission control unit 32 may control transmission 22 by querying a user to provide information and controlling transmission 22 based upon such information.

It should be understood that transmission control unit 32 is merely illustrative and that many other configurations are currently available. For instance, communication systems 56, memory 54 and a processor 52 may be implemented on the same chipset. Moreover, communication system(s) 56, memory 54 and a processor 52 may be supplemented with other devices, or may be configured to comply with a particular transmission system into which it is implemented. Accordingly, transmission control unit 32 may be configured according any vehicle configuration and/or transmission configuration and may control transmission 22 in any manner suitable for a particular design or configuration.

Still referring to FIG. 1, engine 24 may be connectedly engaged with transmission 22 through drive member 23 such that engine 24 may rotate drive member 23 at a given rotational velocity to provide rotational velocity to the transmission 22. Typically, engine 24 may be an internal combustion engine, but other embodiments may be provided such as a steam engine, an electric motor or the like. As is common in many vehicles, a user may selectively control vehicle speed by controlling the rotational velocity of the engine 24 (e.g., varying an engine throttle). In one embodiment, the user may vary engine rotational velocity by depressing an accelerator pedal. However in other embodiments, the user may vary the rotational velocity by engaging a knob, a lever, a trigger, or any other device for enabling a user to vary engine rotational velocity. As is common in vehicles, engine 24 may operate within a finite range of rotational velocities (e.g., 0-6,000 R.P.M.) capable of driving a vehicle at low speeds. Transmission 22 may proportionally change the rotational velocities provided by engine 24 by implementing the selectable gear ratios described above. In particular, engine 24 may operate within its finite range of rotational velocities for each gear ratio such that each particular gear ratio may correspond to a particular range of vehicle speed. For instance, engine rotational velocities for a first gear ratio may provide vehicle speeds from zero to ten miles per hour (M.P.H.), engine rotational velocities for a second gear ratio may provide vehicle speeds from ten M.P.H. to twenty M.P.H., engine rotational velocities for a third gear ratio may provide vehicle speeds from twenty M.P.H. to forty M.P.H., etc. It should be understood that other configurations are contemplated having any number of gear ratios, gear ratios having different ranges of speed or other gear ratio configurations suitable for corresponding engine rotational velocity to vehicle wheels.

Figure 3:
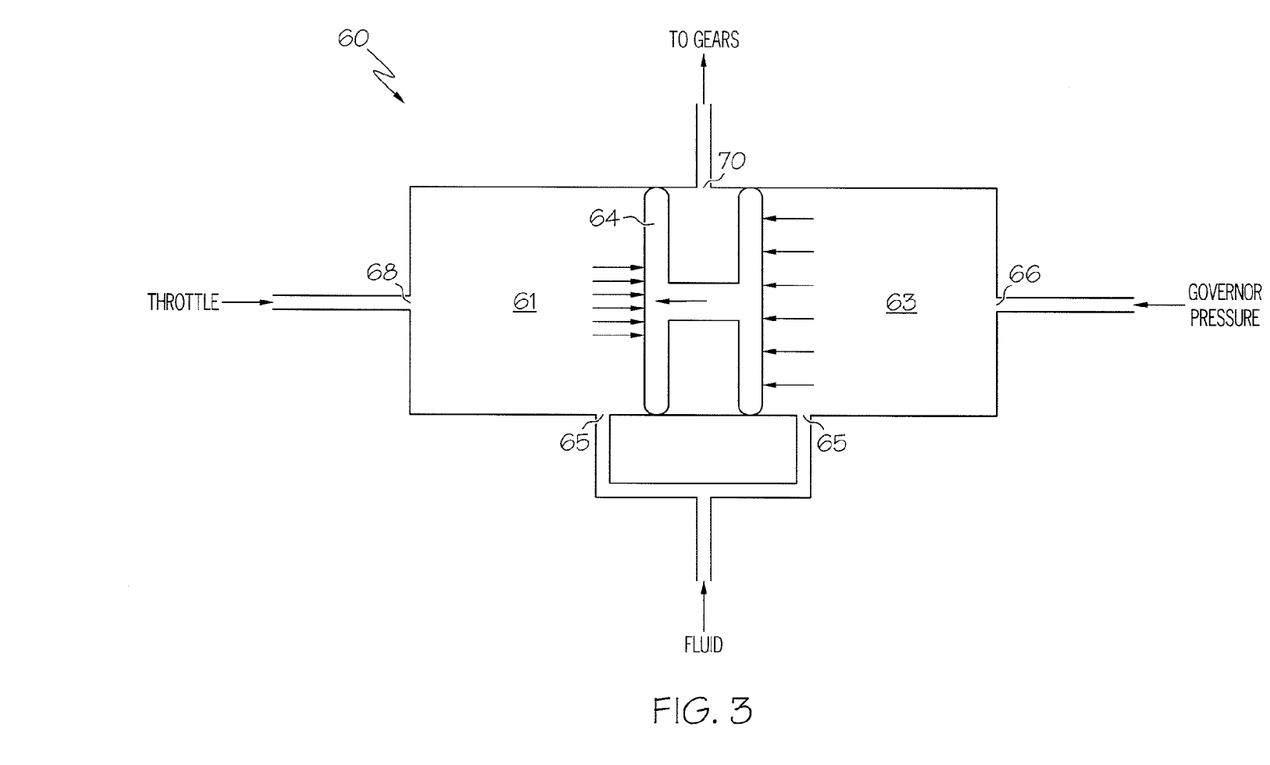
FIG. 3 is a schematic view of a shift controller that can be used for selecting shift points in accordance with one illustrative embodiment of the present invention.

As shown in FIG. 3, a shift controller 60 may provide hydraulic pressure to transmission 22 to select between gear ratios. As is common in transmissions, a gear ratio may be selected when a particular hydraulic pressure is achieved within the transmission 22. Shift controller 60 may regulate the flow of transmission media (i.e., automatic transmission fluid, transmission oil, hydraulic fluid, or the like) by controlling shift valve 44 to thereby select a particular shift point.

As a vehicle changes speeds, shift points may be selected to initiate gear ratio change(s). Shift points may be determined based upon vehicle conditions (i.e., engine rotational velocity, engine torque, vehicle speed, vehicle weight, acceleration, deceleration, environmental conditions, or road conditions and the like). Particular shift points may be assigned based upon limits associated with the conditions. When the limits of a particular condition are achieved (i.e., shift point achieved) a gear ratio change may occur. Shift points may be selected using calculation/selection methods now known or hereafter developed. In one embodiment, shift points may be calculated using predefined algorithms or programs or firmware associating shift points with particular condition limits. In another embodiment, shift points may be selected from a lookup table associating shift points with particular condition limits. In yet another embodiment, shift points may be selected from storage in a memory when a particular condition limit value is achieved. Various other embodiments are contemplated wherein shift points may be based upon conditions and may be calculated in manners which may comport with a particular vehicle or transmission configuration.

Figure 4:
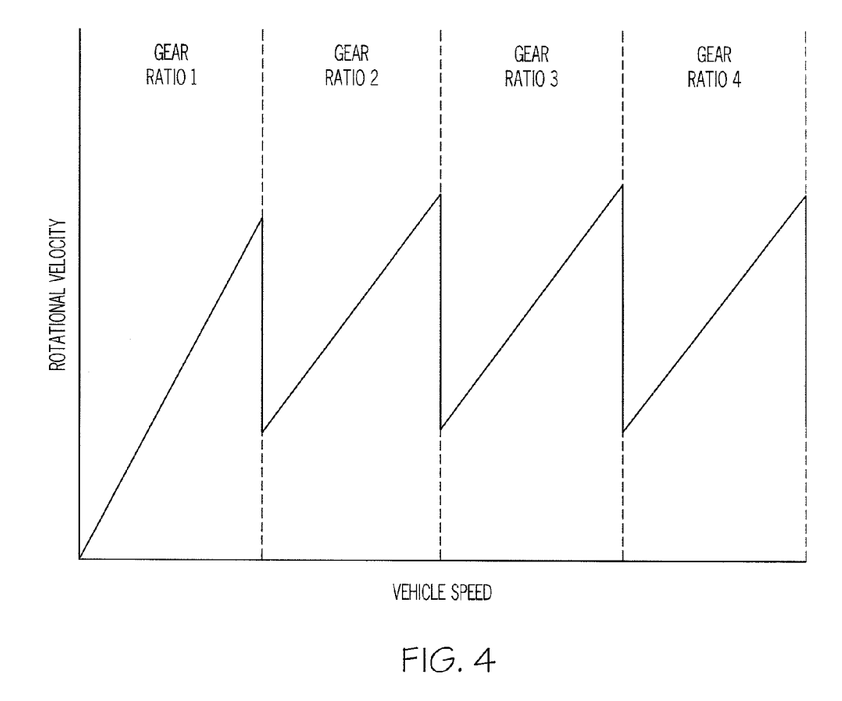
FIG. 4 is a graph depicting engine rotational velocity and vehicle speed as it relates to gear ratio selection in accordance with one illustrative embodiment of the present invention.

In one embodiment, a shift point may be determined based upon engine rotational velocity. As described above, the engine 24 may be capable of operation within a range of rotational velocities having an upper and lower limit (i.e., 0-6,000 R.P.M.). Shift points may be assigned based upon the upper and lower engine rotational velocity limits to ensure engine 24 operates within a given rotational velocity range during vehicle operation. For instance and as shown in FIG. 4, a shift point may be selected for an upper rotational velocity limit where, upon reaching the particular shift point (i.e., during vehicle acceleration), a higher gear ratio may be selected and the rotational velocity of engine 24 may be decreased (i.e., upshift). Conversely, a shift point may be selected for a lower rotational velocity limit where, upon reaching the particular shift point (i.e., during vehicle deceleration), a lower gear ratio may be selected and the rotational velocity of engine 24 may be increased (i.e., downshift). It should be understood that upper and lower rotational velocity limits may be breached as a vehicle accelerates or decelerates. Therefore, shift points may be selected for different gear ratios to ensure proper engine operation during vehicle acceleration and deceleration.

In another embodiment, a shift point may be determined based upon vehicle speed and accelerator depression. As a vehicle operates, a user may indicate a desire to accelerate a vehicle by depressing an accelerator pedal. Since vehicle acceleration may be easier to achieve at high engine rotational velocities, a particular shift point may be assigned to allow engine 24 to reach a high rotational velocity. For instance, substantial pedal depression may indicate a desire to quickly increase vehicle speed. A shift point may be assigned wherein gear change is delayed and engine 24 achieves a high rotational velocity to provide additional acceleration.

In such an embodiment shift controller 60 may provide transmission media to transmission 22 based upon vehicle speed and accelerator pedal depression. In such an embodiment, shift controller may comprise chambers 61 and 63 which may be isolated therebetween with shift valve 64. When the pressure in chamber 63 overcomes the pressure in chamber 61, shift valve 64 may be biased enough to provide media through gear opening 70. By providing media through gear opening 70, hydraulic pressure may be increased in transmission 22 and a gear change may occur (i.e., a shift point may be provided). Transmission media may be provided to chambers 61 and 63 through fluid openings 65 and may be maintained at a constant pressure. In such an embodiment, a governor (not shown) may provide transmission media to chamber 63, via governor opening 66, in correlation to the speed of the vehicle (e.g., additional transmission media may be added when vehicle speed increases). As vehicle speed changes, different volumes of transmission media in chamber 63 may bias shift valve laterally 64 within shift controller 60. Furthermore, a throttle (not shown) may provide transmission media to chamber 61, via throttle opening 68, in correlation to the amount of depression on the pedal (e.g., additional transmission media may be added when accelerator pedal is increasingly depressed). As pedal depression changes, different volumes of transmission media in chamber 61 may bias shift valve 64 laterally within shift controller 60. When the pressure in chamber 63 overcomes the pressure in chamber 61, shift valve 64 may be biased enough to provide media through gear opening 70 to thereby increase transmission hydraulic pressure.

It should be understood that shift controller 60 is merely illustrative and other embodiments are contemplated. For instance, the shift valve 64 in shift controller 60 may be electronically controlled. In such an embodiment, vehicle conditions may be monitored to determine whether a transmission shift is appropriate. When the logic appropriate shift point is determined (i.e., through algorithms, lookup tables stored in memory or the like), shift valve 64 may be controlled to regulate transmission media through gear opening 70.

As illustrated in FIG. 2, at least one vehicle system 40 may be provided to transmit vehicle condition data (i.e., vehicle information, environmental information, transmission information, user information or the like) to transmission control unit 32. In one embodiment, vehicle system 40 may be a road condition sensor. In another embodiment, vehicle system 40 may be a torque sensor. However, vehicle system 40 may be any system operative to transmit vehicle condition data including an electronic control unit, a vehicle condition sensor, a diagnostic unit or any other system now known or hereafter developed. In addition, vehicle system 40 may communicate with transmission control unit 32 using the particular communication methods and forms discussed for transmission control unit 32 below.

Figure 10:
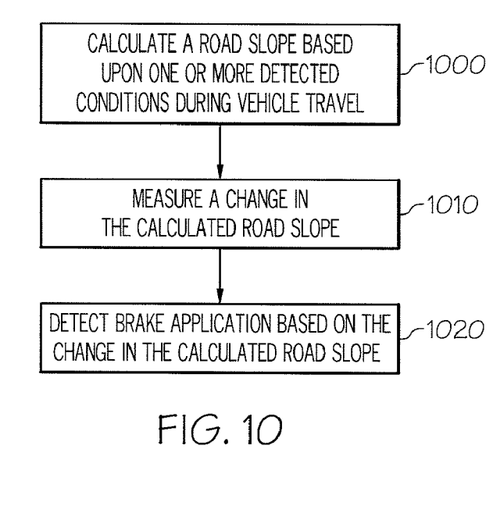
FIG. 10 is a flowchart of one method for controlling a vehicle transmission having gears and being configured to respond to at least one shift point for effectuating an automatic gear change in accordance with one embodiment of the present invention.
Figure 11:
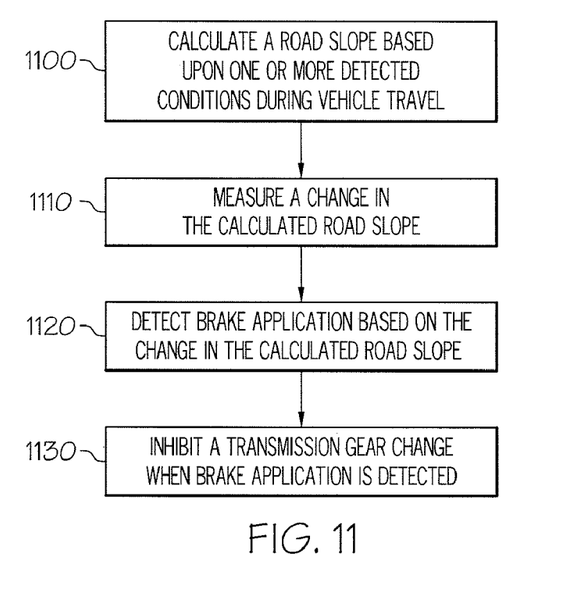
FIG. 11 is a flowchart of one method for determining vehicle braking in accordance with one embodiment of the present invention.
Figure 12:
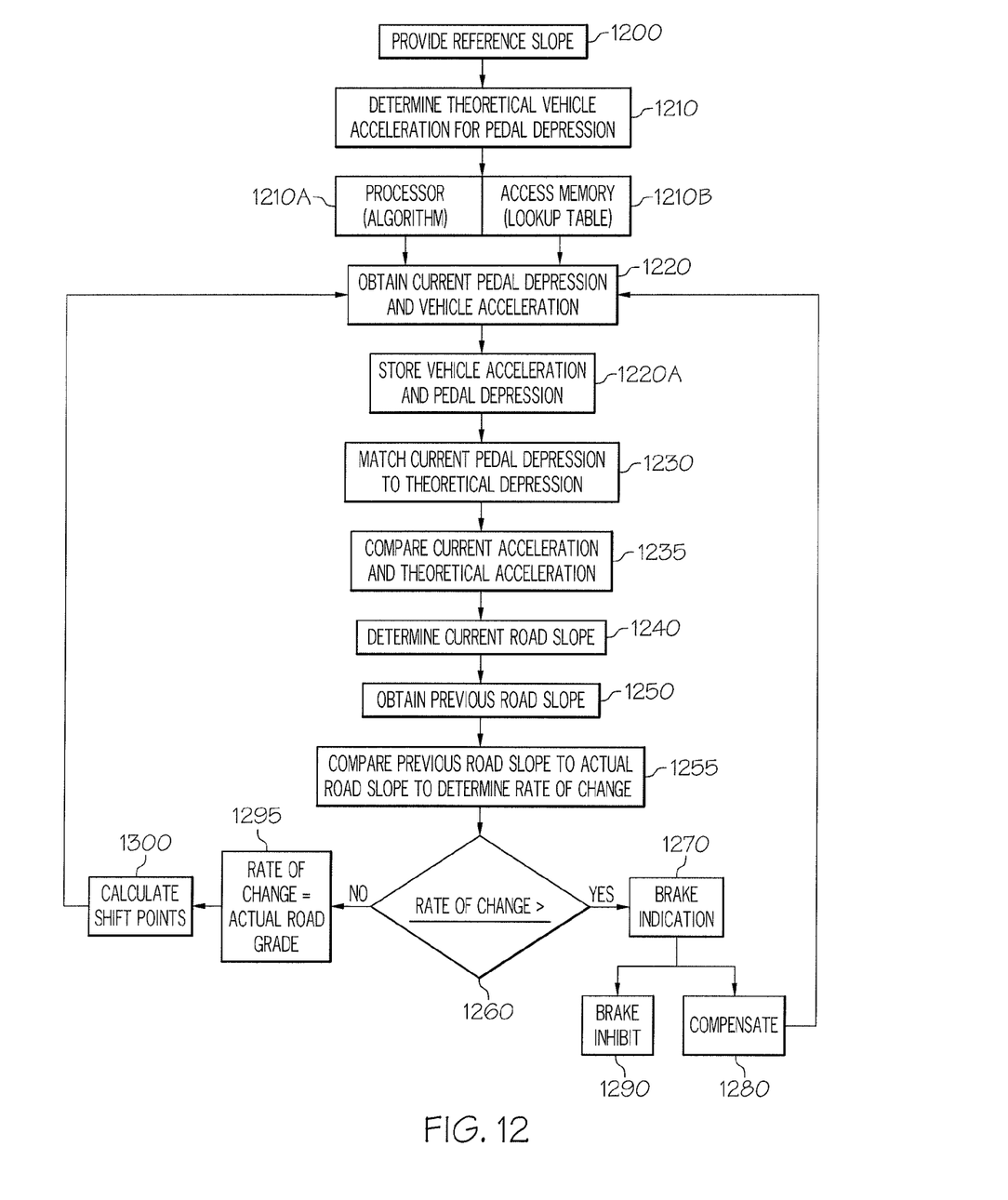
FIG. 12 is a flowchart of a method for controlling a vehicle transmission having gears and being configured to respond to at least one shift point for effectuating an automatic gear change in accordance with one embodiment of the present invention.

In one embodiment and as shown by FIGS. 10-12, the value of a road slope encountered by a vehicle (i.e., the calculated road slope) may be calculated. In such an embodiment and as shown by block 1200, a reference road slope may be provided as a reference upon which calculations may be based. Typically, the reference road slope is a zero slope (i.e., a relatively flat road) but may be any other road slope which comports to a particular design. As shown in blocks 1000, 1100 and 1210, for a given reference road slope, the response of the vehicle to expected vehicle conditions may be determined. As shown by blocks 1210A and 1210B, such response may be calculated by a processor, may be obtained by referencing a lookup table, or may be provided using other calculation methods now known or hereafter developed. Current vehicle conditions may be matched to the expected conditions of the reference road slope and the current vehicle response and expected vehicle response may be compared. Any difference between the expected vehicle response and the current vehicle response may correspond to a value of the road slope encountered. In one embodiment and as shown in block 1220, accelerator pedal position and vehicle acceleration may be monitored to determine the value of the road slope encountered by a vehicle. As discussed above, vehicle system 40 may be provided to monitor such conditions, however, other monitoring systems now know or hereafter developed may also be used. In addition and as shown in block 1220A, such conditions may be stored in memory 44 or any other data storage device.

In such an embodiment, a reference road slope of substantially zero may be provided, wherein the expected acceleration of the vehicle (i.e., the response of the vehicle) may be determined for expected accelerator pedal positions. As shown by blocks 1230 and 1235, current vehicle pedal depression may be matched to the expected pedal depression of the reference road slope and the current vehicle acceleration rate may be compared to the expected acceleration rate. As shown by block 1240, the magnitude of the difference between the current vehicle acceleration and the expected acceleration may indicate the value of the road slope encountered by a vehicle. One example correlating grade with acceleration is provided as follows:
Flat road=0% Grade=0 m/s^2
Common Hill=4% Grade=0.4 m/s^2
Steep Hill=12% Grade=1.2 m/s^2
San Francisco Hill=30% Grade=3.0 m/s^2

Other points can be interpolated or otherwise calculated or obtained. Thus, in this example, when the vehicle is going up a 10% grade hill and towing a heavy trailer the grade calculation may show 30% grade. Note that in this example % Road Grade=Rise/Run, such that a 100% Road Grade=45 degrees=45 ft rise/45 ft run.

Figure 5:
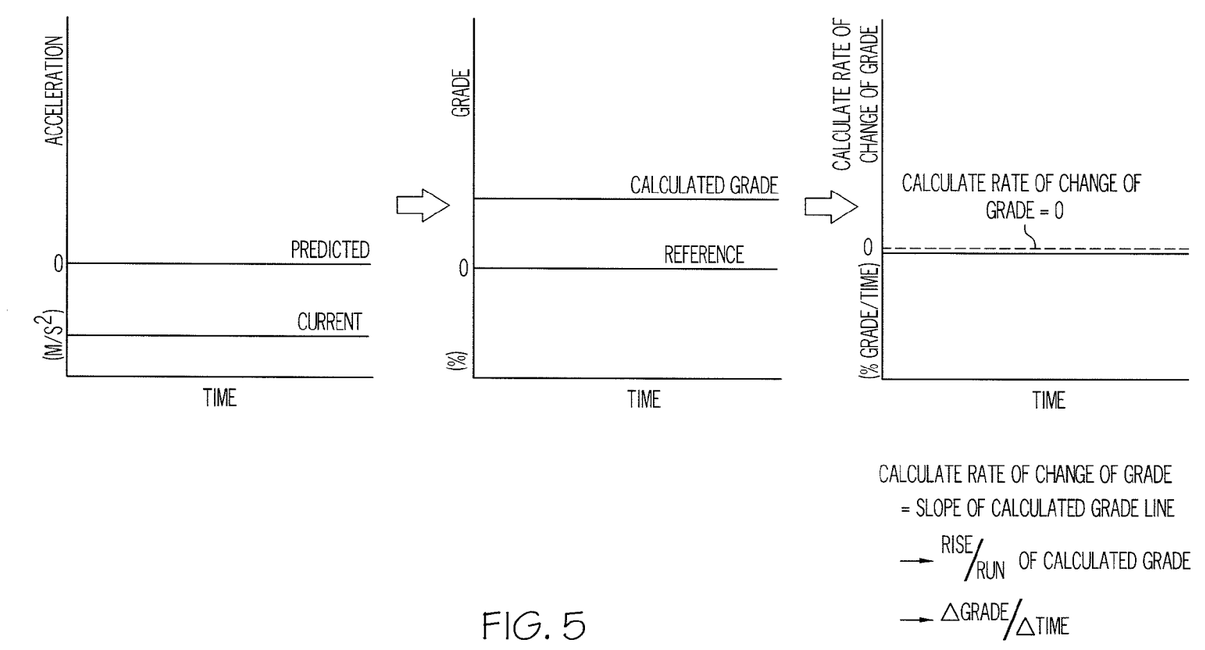
FIG. 5 is a graph depicting correlation between acceleration difference and calculated road slope in accordance with one illustrative embodiment of the present invention.

Thus, if the current vehicle acceleration is higher than the expected acceleration for a given pedal position, the disparity may correlate to a particular declining (i.e., downhill) road slope value. Conversely, as shown by FIG. 5, if the current vehicle acceleration is lower than the expected acceleration for a given pedal position, the disparity may correlate to a particular inclining road slope value (i.e., 2% uphill grade). In another embodiment, and as shown by blocks 1010 and 1110 the rate of change of a road slope encountered by a vehicle may be calculated. In such an embodiment road slope may be calculated similar to above (i.e., provide a reference road slope, match expected conditions with current conditions and measure the difference in vehicle response) and compared with previous road slope calculations. For example, road slope may be calculated as follows:

Expected Vehicle Acceleration−Actual Vehicle Acceleration (where 1 m/s^2=10% Grade)

Since the calculated road slope is an acceleration level it takes into account the grade the driver is driving on, or if the vehicle is towing weight on a trailer. The rate of change of the difference in vehicle responses over time (i.e., the calculated road slope) may correspond to the rate of change of the road slope encountered by a vehicle. In one embodiment, accelerator pedal position and vehicle acceleration may be monitored to determine the rate of change of the road slope encountered by a vehicle. In such an embodiment, a road slope may be calculated similar to above (i.e., provide a reference road slope, match current pedal depression with expected pedal depression and measure the difference in vehicle acceleration rates). As shown in block 1250, previous road slope calculations may be obtained from memory 44 or any other storage device employed when storing previous road slope calculations. As shown by block 1255, the calculated slope may be compared with previous road slope calculations to provide a rate of change of a calculated road slope. The rate of change of the calculated road slope may correspond to the rate of change of the road slope encountered by a vehicle. In one example, the following values could be utilized

EXAMPLE

Figure 6:
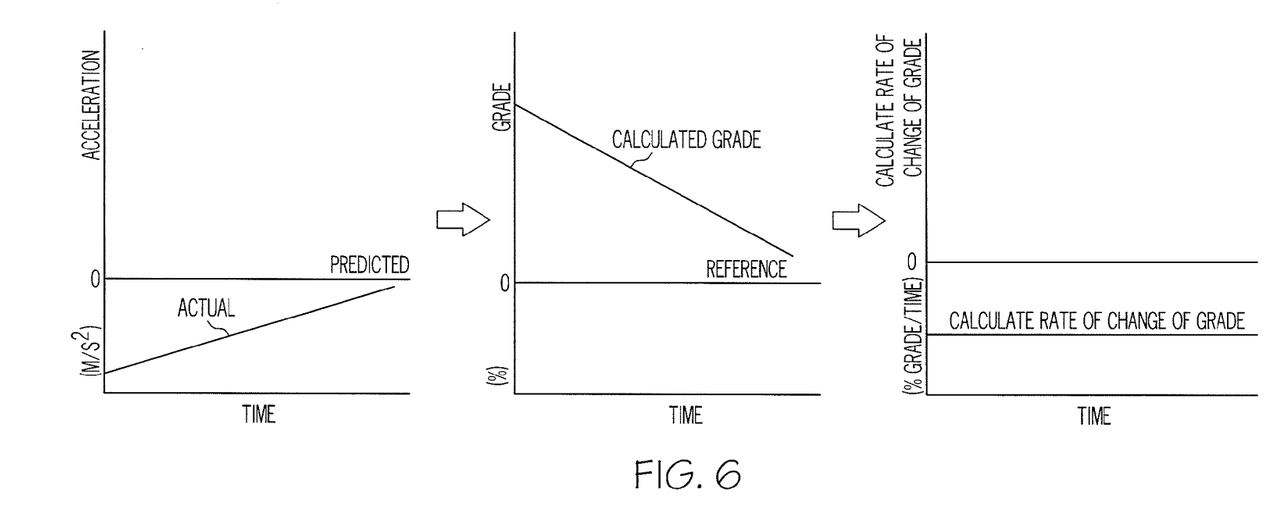
FIG. 6 is a graph depicting correlation between the rate of change of acceleration and rate of change of calculated road slope in accordance with one illustrative embodiment of the present invention.
Figure 7:
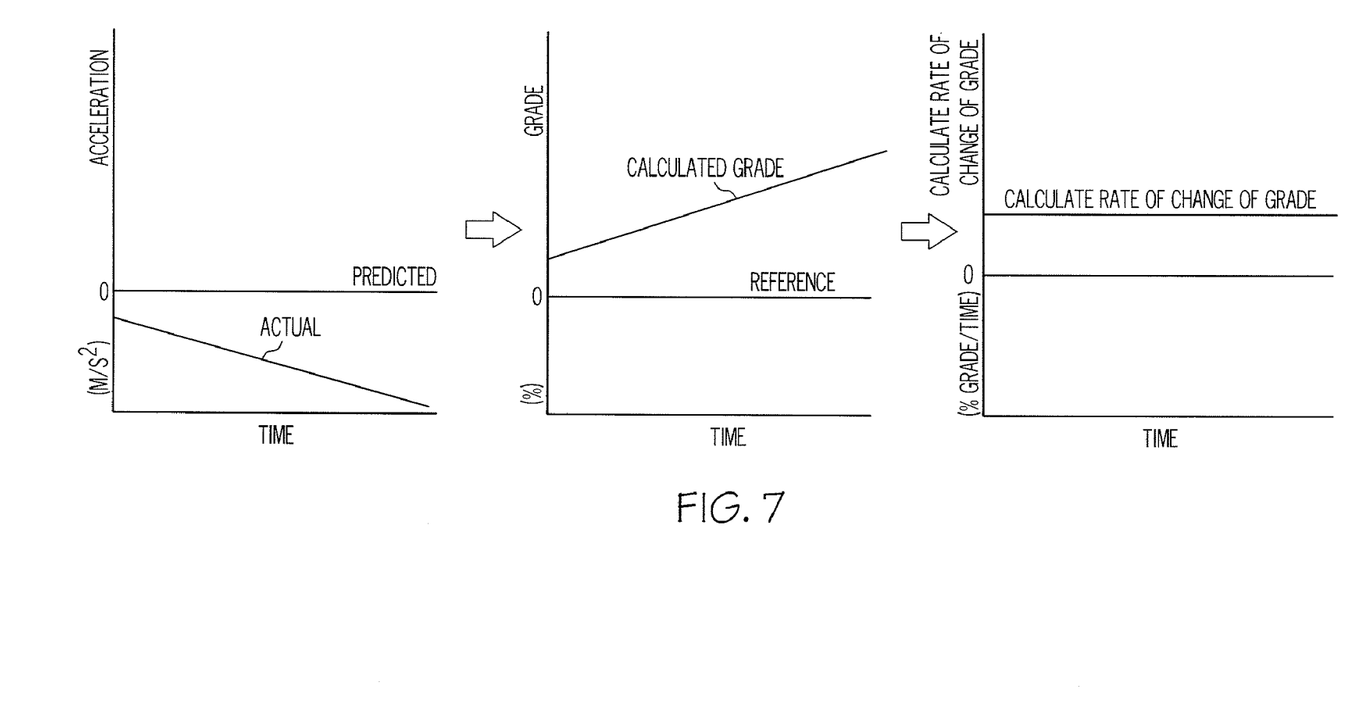
FIG. 7 is a graph depicting correlation between the rate of change of acceleration and rate of change of calculated road slope in accordance with one illustrative embodiment of the present invention.

Road Grade Rate of Change (Slope Relationship of % Grade and Time)
Light Brake Apply=1.0% grade/s=0.1 (m/s^2)/s
Medium Brake Apply=5.0% grade/s 0.5 (m/s^2)/s
Heavy Brake Apply=10.0% grade/s 1.0 (m/s^2)/s
Average Grade Change=0.3% grade/s=0.03 (m/s^2)/s For instance and as shown in FIG. 5, if the difference between the current vehicle acceleration and the expected acceleration remains constant with respect to previous difference, the calculated road slope encountered by the vehicle may be constant. Moreover, if the difference between the current vehicle acceleration and the expected acceleration increases with respect to previous differences, the rate of change of the slope encountered by the vehicle may correspond to a road slope progressively inclining at such a rate of change. Conversely, and as shown in FIG. 6, if the difference between the current vehicle acceleration and the expected acceleration decreases with respect to previous magnitudes, the rate of change of the slope encountered by the vehicle may correspond to a road slope progressively declining at such a rate of change. For example and as shown by FIG. 7, the magnitude of the difference between the current vehicle acceleration and the expected acceleration may increase with respect to previous magnitudes and may correspond to a particular rate of change for the road slope encountered by a vehicle (i.e., 2% grade increasing to a grade of 6%).

A road grade value or rate of change may be correlated to particular differences between expected acceleration and actual acceleration using calculation/selection methods now known or hereafter developed. In one embodiment, a road grade value or rates of change may be correlated using predefined algorithms that associate road grade values or rates of change with particular differences in expected acceleration and actual acceleration. In another embodiment, road grade values or rates of change may be correlated from a predefined lookup table that associates road grade values with particular differences in expected acceleration and actual acceleration. In such embodiments, algorithms, selection tables and the like may be defined according to particular designs and/or configurations. Accordingly, road grade values or rates of change may be correlated by any arithmetic operator (i.e., a processor, etc.) or may be selected from data stored upon any memory device (i.e., RAM, CD drive, etc.).

In other embodiments, vehicle road grade may be calculated using other vehicle conditions such as GPS estimated trajectory, road images from a camera, torque, shock compression, speed, fuel consumption or the like. Additionally, in other embodiments, vehicle road grade may be calculated using methods of calculation currently known in the art or later developed, such as differential equations, linear equations or the like. It should be understood that road slope calculation based upon acceleration and pedal position is merely illustrative and may be achieved in any manner to comport with a particular vehicle or transmission control unit design.

In one embodiment and as shown by FIGS. 10-12, vehicle conditions such as engine torque, vehicle speed, vehicle weight, acceleration, deceleration and the like may be monitored to determine the occurrence of vehicle braking. According to the illustrative embodiment, and as illustrated in blocks 1020 and 1120, the rate of change of a calculated road slope may indicate vehicle braking without reliance upon a brake switch. Typically, when a vehicle encounters actual road slope change, the calculated road slope rates of change remain within a particular range. If the rate of change of the calculated road slope falls outside of such a range, vehicle braking may be indicated by providing a signal indicating that vehicle braking is occurring (the braking signal would therefore be based on rate of change of a calculated road slope).

In particular, during brake pedal depression and brake pedal release a vehicle may undergo changes in acceleration without accelerator pedal depression. Therefore to determine vehicle braking as shown in block 1260, a rate of change of a road slope may be calculated and compared to the range associated with actual road slope change. The values of such a range may be based upon acceleration and accelerator pedal depression typically encountered during actual road slope change. However, the values of such a range may be determined using algorithms or calculations now known or hereafter developed that correlate acceleration and accelerator pedal depression to such values. For instance, an expected vehicle acceleration based upon a reference road slope may be determined for no accelerator pedal depression. The expected acceleration may be compared to the current vehicle acceleration to determine a calculated road slope. As discussed above and shown in block 1255, the calculated road slope may be compared to previous road slopes to determine a rate of change of the calculated road slope. As shown in block 1270, if the rate of change of the calculated road slope falls outside the range associated with actual change in road slope, then vehicle braking may be indicated. However, as shown in block 1295, if the rate of change of the calculated road slope falls within the range associated with actual change in road slope, the calculated rate of change may correlate to the actual rate of change of the road slope. As shown in block 1300 and further discussed below, shift points may subsequently be calculated.

Figure 8:
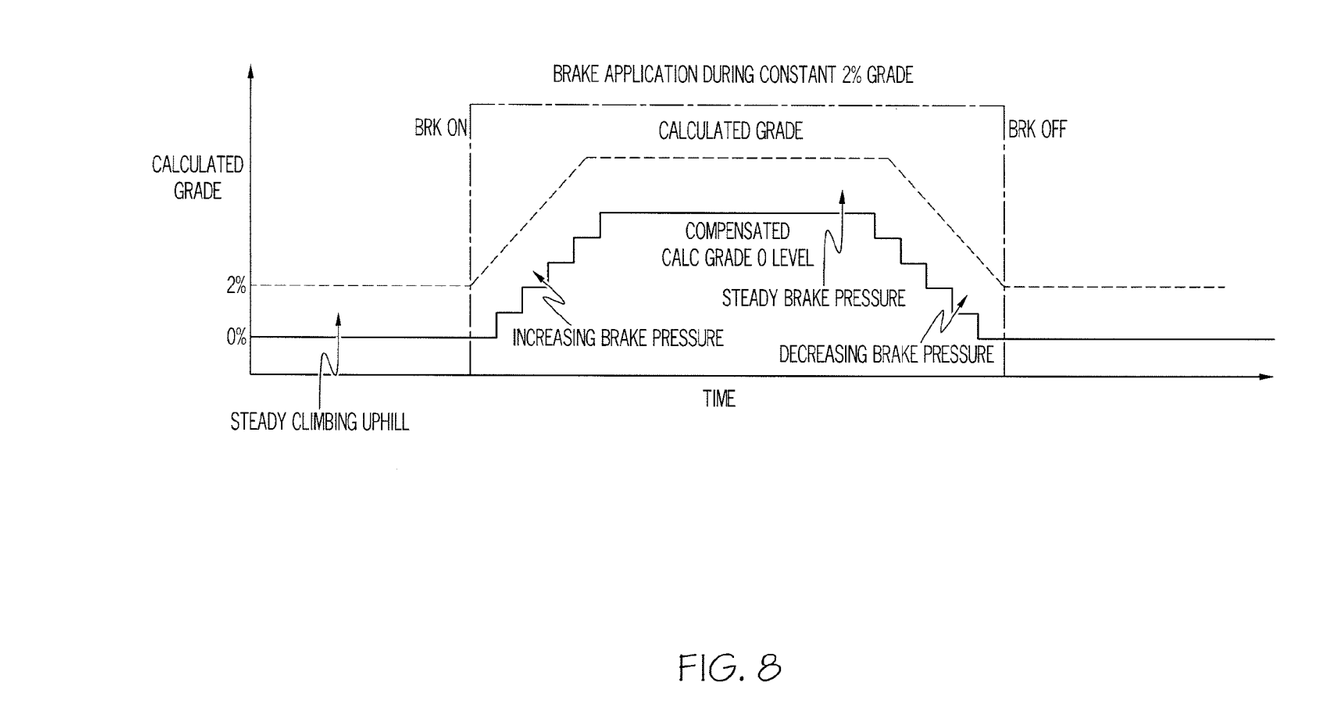
FIG. 8 is a graph depicting correlation between the rate of change of acceleration and rate of change of calculated road slope to determine vehicle braking in accordance with one illustrative embodiment of the present invention.

In one embodiment, during actual change in road slope, a rate of change of a calculated road slope may be between 0.0 (% grade/sec) to about 1.0 (% grade/sec). However, as shown in FIG. 8, when the rate of change of the calculated slope is greater than about 1.0 (% grade/sec) vehicle brake depression may be indicated. Conversely, as shown in FIG. 8, when the magnitude of the rate of change of the calculated slope is less than about 0.0 (% grade/sec) (i.e., or the lowest limit for actual road slope change) brake depression may be indicated. It should be understood that the values described are merely illustrative and that many values/ranges may be implemented according to the particular vehicle and/or transmission configuration. It should also be understood that according to principles of the present invention, monitoring road slope to indicate vehicle braking may be applied to many systems which utilize brake indication signals, such as anti-lock brake systems, passenger restraint systems, supplemental restraint systems or the like.

Determination of vehicle braking based upon the rate of change of a calculated road slope may be made using calculation/selection methods now known or hereafter developed. In one embodiment, vehicle braking may be determined using algorithms that associate vehicle braking with a particular rate of change of calculated road grade. In another embodiment, vehicle braking may be determined using a predefined lookup table that associates vehicle braking with a particular rate of change of calculated road grade. In such embodiments, algorithms, selection tables and the like may be defined according to particular designs and/or configurations. Accordingly, vehicle braking may be determined by any arithmetic operator (i.e., a processor, etc.) or may be selected from data stored upon any memory device (i.e., RAM, CD drive, etc.).

In yet another embodiment, vehicle conditions such as engine torque, vehicle speed, vehicle weight, acceleration, deceleration and the like may be monitored to determine the magnitude of applied brake force. According to the illustrative embodiment, the magnitude of applied brake force may be determined by calculating the rate of change of the road slope. Thus, the rate of change of road slope may be calculated similar to the methods described above for vehicle braking indication. Typically, during brake pedal depression and brake pedal release a vehicle may undergo changes in acceleration without accelerator pedal depression. Similar to road slope calculations above, the rate of change of the acceleration during brake pedal depression and release may be used to calculate a rate of change of a road slope. The calculated rate of change of the road slope may be correlated to a particular brake force magnitude. For instance, a expected vehicle acceleration may be determined for no accelerator pedal depression, for vehicle travel along a reference road slope. The expected acceleration may be compared to the current vehicle acceleration to determine a calculated road slope. The calculated road slope may be monitored over time to determine a rate of change of the calculated road slope. The magnitude of the rate of change may be correlated to a particular brake force magnitude. In one embodiment, a brake force magnitude may be determined using algorithms that associate brake force magnitudes to particular calculated road grade rates of change. In another embodiment, brake force magnitude may be determined using a predefined lookup table that associates brake force magnitudes with particular calculated road grade rates of change. In such embodiments, algorithms, selection tables and the like may be defined according to particular designs and/or configurations. Accordingly, brake force magnitude may be determined by any arithmetic operator (i.e., a processor, etc.) or may be selected from data stored upon any memory device (i.e., RAM, CD drive, etc.).

As shown in FIG. 8, during brake pedal application, the magnitude of the rate of change of the calculated road slope may be 5.0 (% Grade/sec). Such rate of change may correspond to a medium force being applied to the brake pedal. Similarly, after brake pedal application, the magnitude of the rate of change of the calculated road slope may be 0.0 (% Grade/sec). Such rate of change may correspond to a constant deceleration rate. Moreover, during brake pedal release, the magnitude of the rate of change of the calculated road slope may be 5.0 (% Grade/sec). Such rate of change may correspond to a magnitude of 0 being applied by the brake pedal assembly to return the brake pedal to an original position. It should be understood that these values are merely illustrative and that many values/ranges may be implemented according to the particular vehicle and/or transmission configuration. It should also be understood that monitoring road slope to determine brake force magnitude may be implemented in many systems which implement applied brake force indication such as anti-lock brake systems, passenger restraint systems, supplemental restraint systems or the like.

Figure 9:
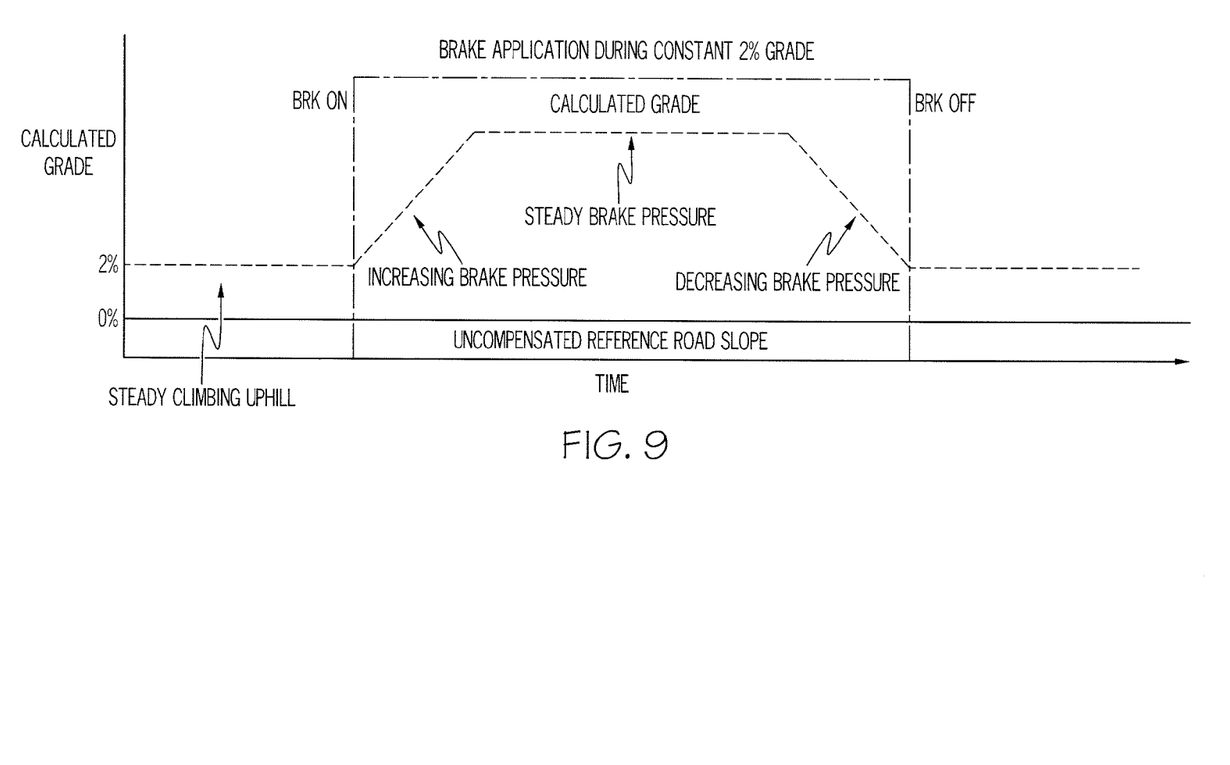
FIG. 9 is a graph depicting correlation between the rate of change of acceleration and rate of change of calculated road slope to determine vehicle braking without compensation to the reference road slope in accordance with one illustrative embodiment of the present invention.

In one embodiment and as shown by FIG. 12, a reference road slope may be compensated in order to maintain accurate road slope estimation subsequent to vehicle braking indication. As described above, vehicle road slope may be monitored, rather than a brake switch, to determine the occurrence of vehicle braking. In such an embodiment and as explained above, during initial brake pedal application and subsequent brake pedal release, the rate of change of the calculated road slope may change significantly though no actual road slope has been encountered. Subsequent to braking, road slope calculations may indicate a road slope different from the actual slope traveled. Accordingly and as shown by block 1280, a reference road slope may be compensated subsequent to brake application. Therefore, when calculating subsequent road slopes (i.e., returning to block 1220), the reference road slope may be adjusted to provide accurate road slope calculations. As shown by FIG. 9, during brake pedal application, the calculated road slope may significantly increase though no actual change in road slope occurred. If such increase is greater than the range associated with actual road slope change, as discussed above, brake application may be indicated. However, the increase in disparity between the reference road slope and the calculated road slope may erroneously reflect a change in actual road slope. Therefore, a reference road slope may be compensated when vehicle braking is indicated such that subsequent road slope calculations may be accurate. In one embodiment and as shown by FIG. 8, during initial brake pedal application and subsequent brake pedal release, a reference road slope may be compensated to achieve the same difference between the calculated road slope and reference road slope prior to brake pedal depression. In another embodiment, calculated road slope may be reduced to achieve the same difference between the calculated road slope and reference road slope prior to brake pedal depression. As shown in FIG. 8, compensation or reduction may be achieved by continually applying a step function to the reference road slope in the same direction as the calculated road slope until vehicle braking ceases. However, compensation or reduction may also be achieved through other means known in the art or hereafter developed such as applying a ramp function to the reference/calculated road slope, applying a compensation function to the reference/calculated road slope or the like.

In another embodiment and as shown by block 1130 in FIG. 11 and block 1290 in FIG. 12, shifting may be inhibited during unfavorable transmission conditions such as vehicle braking, loss of traction, transmission failure, low transmission fluid, overheating or the like. Similar to above, various conditions may be monitored to determine whether unfavorable conditions may be occurring. For instance, wheel speed may be monitored to determine loss of traction, gear rotation may be monitored to determine transmission failure, transmission temperature may be monitored to determine transmission overheating or any condition indicative of hazardous transmission shifting may be monitored. Upon the occurrence of such conditions, transmission 22 may be inhibited from shifting (e.g., by adjusting transmission shift points). In one embodiment, road slope may be monitored to determine vehicle braking and therefore the transmission gear change point can be adjusted when vehicle braking is indicated. Such indication may ensure vehicle is not further accelerated by an improper upshift and may improve shift inhibition by overcoming inaccuracies in brake switch.

In one embodiment and as shown by FIGS. 10-12, transmission shift points may be selected and/or calculated based upon the calculated road slope. As described earlier, the rate of change of the calculated road slope may indicate whether a vehicle is braking irrespective of a brake switch. In the absence of such an indication, shift points may be calculated based upon the calculated road slope as shown by block 1300. In particular, in one embodiment, transmission shift points may be delayed when the calculated road slope indicates a moderate slope. For instance, as a vehicle climbs a road slope, a transmission shift point may be delayed (i.e., transmission 22 may remain in the current gear ratio) to thereby allow additional rotational velocity to be provided to the transmission 22 to overcome the slope. In another embodiment, different shift points may be calculated and selected when the calculated road slope indicates a more severe slope. For instance, as a vehicle climbs an increasing road slope, a lower transmission shift point may be selected (i.e., the transmission 22 may select a lower gear ratio) to thereby allow additional rotational velocity/power to be provided to the transmission 22 to overcome the incline. In yet another embodiment, shift points values may be selected based upon the magnitude or rate of change of the calculated road grade. For instance, as a vehicle climbs an increasing road slope, a shift point may continue to increase in correspondence to the increasing slope.

Consequently, it should be understood that the methods provided herein are only examples of determining brake indication based upon calculated road slope, determining applied brake force based upon calculated road slope or selecting shift points based upon calculated road slope and other methods are possible without deviating from the principles of the invention. For example, the road slope could be based upon other conditions such as GPS estimated trajectory, road images from a camera, torque, shock compression, speed, fuel consumption, coefficient of friction, road bank, change in direction, road surface or the like.

As can be understood, the functionality of the models, methods, and algorithms described herein can be implemented using software, firmware, and/or associated hardware circuitry for carrying out the desired tasks. For instance, the various functionalities described can be programmed as a series of instructions, code, or commands using general purpose or special purpose programming languages, and can be executed on one or more general purpose or special purpose computers, controllers, processors or other control circuitry.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. For example, the method for controlling a transmission in accordance with the present invention may calculate a road slope, measure the change in the road slope, detect brake application based upon the particular change in the slope and inhibit transmission shifting when braking is indicated. Accordingly, while some of the alternative embodiments of the system for regulating engine variables have been discussed specifically, other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

What is claimed is:

1. A method for controlling a vehicle transmission having gears and being configured to respond to at least one shift point for effectuating an automatic gear change, comprising:
    calculating a road slope based upon one or more detected conditions during vehicle travel;
    measuring a rate of change in the calculated road slope;
    detecting brake application based on the rate of change in the calculated road slope; and
    inhibiting a transmission gear change when brake application is detected.

2. The method as recited in claim 1, wherein the road slope calculation is based upon acceleration of the vehicle.

3. The method as recited in claim 1, wherein the road slope calculation is based upon accelerator pedal depression.

4. The method as recited in claim 1, wherein measuring change in the calculated road slope further includes comparing the calculated road slope with a reference road slope.

5. The method as recited in claim 4, wherein measuring change in the calculated road slope further includes compensating the reference road slope.

6. The method as recited in claim 5, wherein the reference road slope is representative of a flat road.

7. The method as recited in claim 5, wherein the reference road slope is compensated by an increasing step function.

8. The method as recited in claim 1, wherein brake application is detected if the change in the calculated road slope is greater than about 1.0 (% grade/s).

9. The method as recited in claim 1, wherein the operation of detecting brake application is accomplished without taking into account the status of a brake switch.

10. A method for determining vehicle braking, comprising:
    detecting conditions during vehicle travel;
    calculating a road slope based upon one or more detected conditions;
    measuring a rate of change in the calculated road slope;
    comparing the rate of change in the calculated road slope to a range of values representative of actual slope change encountered by a vehicle; and
    indicating brake application when the rate of change in the calculated road slope falls outside the range of values.

11. The method as recited in claim 10, wherein the road slope calculation is based upon acceleration of the vehicle.

12. The method as recited in claim 10, wherein the road slope calculation is based upon accelerator pedal depression.

13. The method as recited in claim 10, wherein measuring change in the calculated road slope further includes comparing the calculated road slope with a reference road slope.

14. The method as recited in claim 13, wherein measuring change in the calculated road slope further includes compensating the reference road slope.

15. The method as recited in claim 13, wherein the reference road slope is representative of a flat road.

16. The method as recited in claim 10, wherein the range of values is between 0.0% per second and 1.0% per second.

17. The method as recited in claim 10, wherein the operation of detecting brake application is accomplished without taking into account the status of a brake switch.

18. A vehicle braking indication system comprising:
    vehicle condition sensors;
    at least one processor operative to calculate a rate of change in road slope from information systems and to indicate vehicle brake application based upon the calculated rate of change in road slope; and
    a transmission control system operative to inhibit a transmission gear change based upon the vehicle brake indication.

19. The system recited in claim 18, wherein the processor is operative to compare the calculated road slope with an reference road slope to indicate vehicle brake application.

20. The system recited in claim 18, wherein the processor is operative to adjust the reference road slope to indicate a flat road by applying an increasing step function.

21. The system recited in claim 18, wherein the vehicle sensors detect vehicle speed and accelerator pedal depression.

* * * * *